United States Patent
Kanevsky et al.

(10) Patent No.: US 6,832,189 B1
(45) Date of Patent: Dec. 14, 2004

(54) INTEGRATION OF SPEECH RECOGNITION AND STENOGRAPHIC SERVICES FOR IMPROVED ASR TRAINING

(75) Inventors: Dimitri Kanevsky, Ossining, NY (US); Sara H. Basson, White Plains, NY (US); Peter G. Fairweather, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 09/713,720

(22) Filed: Nov. 15, 2000

(51) Int. Cl.[7] .............................................. G10L 15/26
(52) U.S. Cl. ..................................... 704/235; 704/270
(58) Field of Search ............................. 704/9, 10, 235, 704/257, 260, 270, 271, 272, 276, 277

(56) References Cited

U.S. PATENT DOCUMENTS

| | | | |
|---|---|---|---|
| 5,963,903 A | 10/1999 | Hon et al. | 704/254 |
| 6,076,056 A | 6/2000 | Huang et al. | 704/254 |
| 6,122,614 A * | 9/2000 | Kahn et al. | 704/235 |
| 6,125,341 A | 9/2000 | Raud et al. | 704/8 |
| 6,243,680 B1 * | 6/2001 | Gupta et al. | 704/260 |
| 6,366,882 B1 * | 4/2002 | Bijl et al. | 704/235 |
| 6,490,557 B1 * | 12/2002 | Jeppesen | 704/235 |
| 6,507,816 B2 * | 1/2003 | Ortega | 704/235 |

* cited by examiner

Primary Examiner—Richemond Dorvil
Assistant Examiner—Abul K. Azad
(74) Attorney, Agent, or Firm—Louis J. Percello, Esq.

(57) ABSTRACT

A system and method is provided for training a speaker-dependent Automatic Speech Recognition (ASR) system to a desired level of accuracy. In one aspect of the system and method, a user requests an ASR Training Center to train his or her ASR system within certain service parameters. During training, a certain level of accuracy is maintained, even during the very first session, by having a stenographer transcribe the audio material. When the user uses his or her ASR system, the stenographic transcription, rather than the ASR system transcription, is output to the user until the ASR Training Center determines that the user's ASR system has achieved the desired level of accuracy. The stenographic transcription is also used by the ASR Training Center to train the user's ASR system in a manner appropriate to that system.

33 Claims, 9 Drawing Sheets

| 401 | USER NAME |
| 405 | ASR SYSTEM |
| 406 | ASR SYSTEM SERIAL NUMBER |
| 410 | REQUIRED LEVEL OF ACCURACY |
| 415 | CURRENT LEVEL OF ACCURACY |
| 420 | RECORDING ENVIRONMENT |
| 430 | ACCESS PERMISSION |
| 440 | SPEAKER PROFILE(S) |
| 450 | TOPIC VOCABULARY |

*FIG. 4*

JOB NO. ☐ ASR SYSTEM: IBM VIAVOICE
CUSTOMER ACCOUNT: ☐ SERIAL NO.: 3X592-HP9825-NT
DESIRED LEVEL OF ACCURACY: 99%
HIGHEST BID: ☐ SPEAKERS: 3
LOWEST BID: ☐ ACCESS: NO
TOPICS: Ø

| BID | EST. TIME TO TRAIN | TIMES OF TRAINING | ESTIMATED ACCURACY | PRICE | + E-MAIL | + PRINT |
|---|---|---|---|---|---|---|
| 1 | 30 HOURS | ALL | 92% | $50 | $55 | $60 |
| 2 | 30 HOURS | DAYTIME ONLY 8 AM - 5 PM | 92% | $45 | $50 | $55 |
| 3 | 20 HOURS | ALL | 85% | $40 | $45 | $50 |
| 4 | 20 HOURS | DAYTIME ONLY 8 AM - 5 PM | 85% | $35 | $40 | $45 |
| 5 | 20 HOURS | MON./TUES./WED. 6 AM - 9 PM | 85% | $30 | $35 | $40 |
| 6 | ... | ... | ... | ... | ... | ... |
| 7 | ... | ... | ... | ... | ... | ... |
| 8 | ... | ... | ... | ... | ... | ... |

FIG. 7

INTEGRATION OF SPEECH RECOGNITION AND STENOGRAPHIC SERVICES FOR IMPROVED ASR TRAINING

BACKGROUND OF THE INVENTION

1. Field of the Invention

This invention relates to a system and method for the training of Automatic Speech Recognition (ASR) systems, and, in particular, to a system and method which maintains a desired level of accuracy in the user's ASR system during the period of training.

2. Description of the Related Art

Presently, many of the most common ASR systems are comprised of software that runs on an IBM-clone PC (e.g., IBM's ViaVoice™, Dragon's Naturally Speaking™, etc.), although an ASR system can be comprised of any admixture of hardware and software that can recognize spoken words. Typically, ASR systems compare samples of one or more spoken words to samples stored within memory, where the samples are acoustic recordings of pieces of speech.

One of the problems with ASR is that it needs to be trained for each user in order to become efficient. In other words, ASR works best, i.e., has the greatest percentage of correct words and sentences, when it is allowed to store a large range of acoustic samples for each speaker. This process of recording samples with associated phonemes that make up words is called "training." Examples of training are contained in U.S. Pat. No. 5,963,903 to Hon et al., U.S. Pat. No. 6,076,056 to Huang et al., and U.S. Pat. No. 6,125,341 to Raud et al., all of which are hereby incorporated by reference.

Training is inconvenient for the new user, who needs to sit with the ASR system for a period of time in order that the system "learn" the user's voice. This forces a dilemma on the designers of ASR systems: if you have a period of training long enough to guarantee good results, the user may find that the time spent is a considerable nuisance. On the other hand, if you have a quick and easy period of training, it may be insufficient, and the user may find an unacceptable level of errors in interpretation.

Other problems related to training involve its two essential parts: the adaptation of the acoustic model, and the adaptation of the language model. The acoustic model relates to the sound samples, and learning the pronunciation range of a speaker. The language model relates to the vocabulary and grammar used by the speaker, and learning the more common words and phrases of the speaker. Both of these adaptations require time in order to accumulate the necessary amount of data. In addition, there may be environmental variances during training. For example, the speaker may have a cold during a segment of the training period, thus affecting the acoustic model; or the speaker may be a writer who was writing (by speaking aloud) an essay on medicine during a segment of the training period, thus affecting the language model. Speaker-independent ASR systems, by definition, do not require training in one speaker's voice. However, speaker-independent ASR systems have an unacceptably high level of errors in their transcriptions.

Therefore, there is a need for a speaker-dependent ASR system that does not burden the user with an extensive training period, yet retains a high level of accuracy in its transcriptions.

SUMMARY OF THE INVENTION

One aspect of this invention is to provide a speaker-dependent ASR system and method that does not burden the user with an extensive training period.

Another aspect of the invention is to provide a speaker-dependent ASR system and method that retains a high level of accuracy, while not requiring an extensive period of training.

Yet another aspect of the invention is to provide a speaker-dependent ASR system and method that allows the user to set an arbitrary level of accuracy.

A further aspect of the invention is to provide a system and method by which a consumer, who already owns an ASR system, pays for the training of the ASR system.

Yet a further aspect of the invention is to provide a system and method by which a consumer, who already owns an ASR system, pays for an arbitrary level of accuracy in resulting transcriptions.

To fulfill the above and other aspects, a system and method is provided for training a speaker-dependent Automatic Speech Recognition (ASR) system to a desired level of accuracy. In one aspect of the system and method, a user requests an ASR Training Center to train his or her ASR system within certain service parameters. During training, a certain level of accuracy is maintained, even during the very first session, by having a stenographer transcribe the audio material. When the user uses his or her ASR system, the stenographic transcription, rather than the ASR system transcription, is output to the user until the ASR Training Center determines that the user's ASR system has achieved the desired level of accuracy. The stenographic transcription is also used by the ASR Training Center to train the user's ASR system in a manner appropriate to that system.

BRIEF DESCRIPTION OF THE FIGURES

The foregoing and other objects, aspects and advantages will be better understood from the following detailed description of preferred embodiments of the invention with reference to the following drawings:

FIG. 4 is an exemplary user record according to an embodiment of the present invention;

FIG. 7 is an exemplary Automated Bidding Web Page according to an embodiment of the present invention.

DETAILED DESCRIPTION OF THE PREFERRED EMBODIMENTS

In the following description, the terms "server" and "database" are used in a generic functional sense. The term "server' should be understood within the client/server architectural model—the client requests a service, the server provides a service. The term "database" can be understood in its most broad definition, as a data structure storing records. Thus, the servers and databases described below are not necessarily housed in different pieces of hardware. Indeed, any of the servers or databases could be implemented using a distributed network system, where the functional elements of a server or database are not only distributed among nodes, but will often migrate from node to node. On the opposite end of the spectrum, all of the servers and databases discussed below could be resident on one mainframe computer. However much of each server or database is implemented in software, firmware, or hardware is also open to many variations, as is well known in the art.

In like manner, the terms "network" and "computer" are used in the most general sense. A "computer" is any computing means, from a single microprocessor or microcontroller to a computer system distributed over multiple processing nodes. A "network" includes any means that connects computers. Thus, although the preferred embodiments use the Internet and an Ethernet Local Area Network (LAN), the nodes could connect to a central server through individual point-to-point connections. Other terms in the text are also to be understood in a generic functional sense, as would be known by one skilled in the art.

I. Environments

Figure 1A:
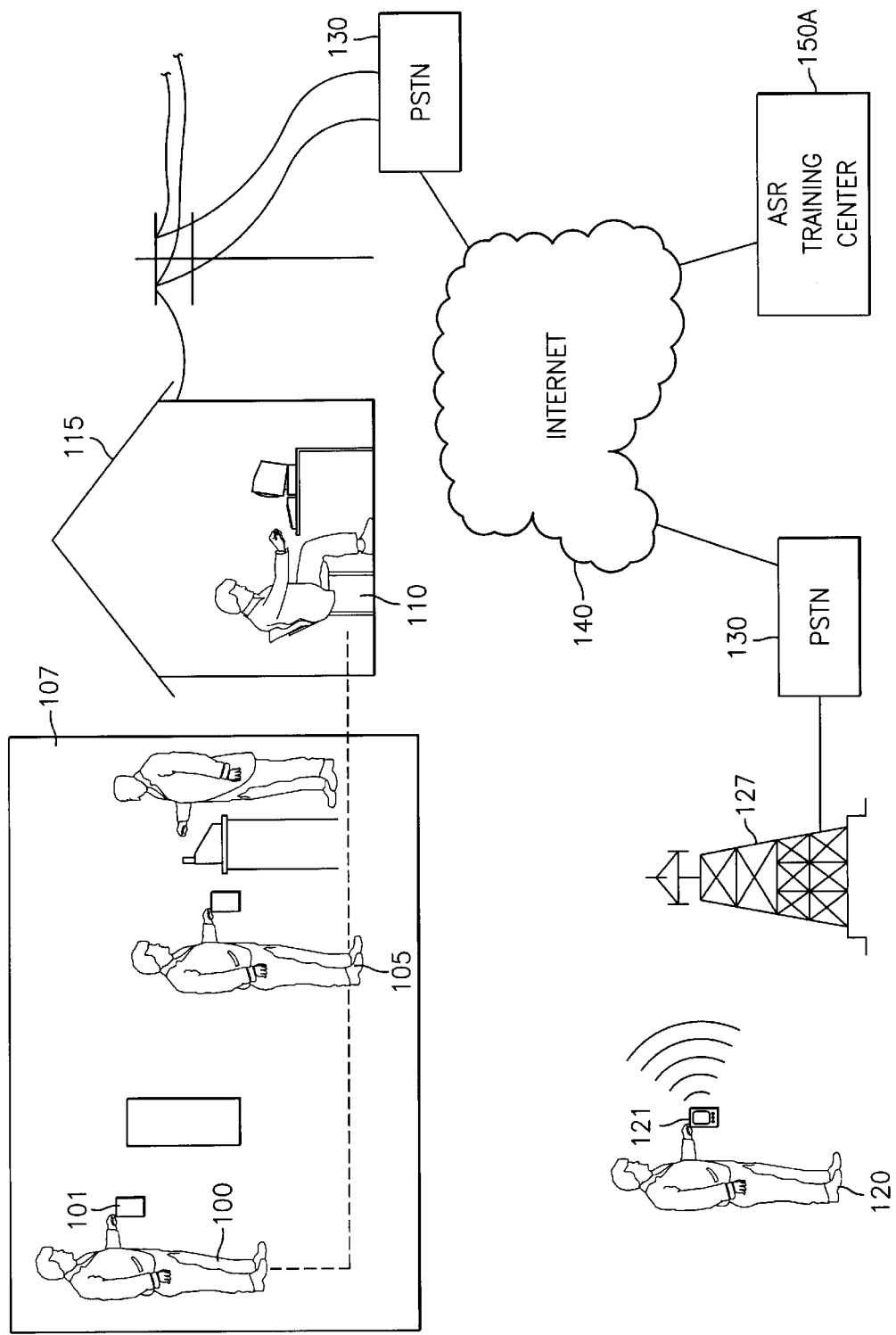
FIGS. 1A and 1B are block diagrams of various environments in which embodiments of the present invention may be employed.
Figure 1B:
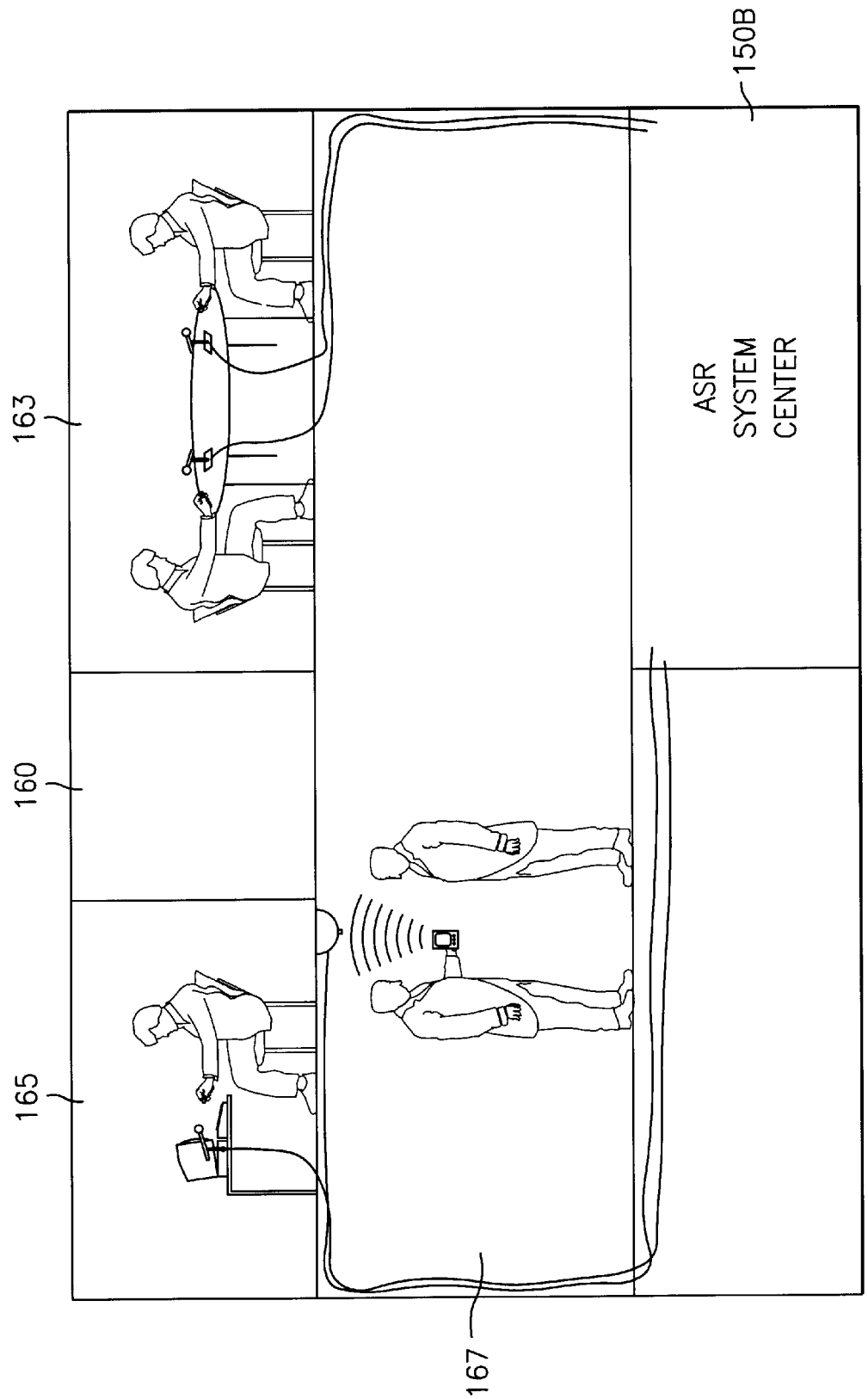

The present invention may be embodied in many different environments, two of which are shown in FIGS. 1A and 1B. FIG. 1A shows a distributed system, where different ASR systems may be employed by different users, and those different users connect with one or more Training Centers in order to train their ASR systems. On the other hand, FIG. 1B shows a centralized system, where a centralized ASR/Stenographer/ASR Training Center is used by one institution, and the members of that institution can access the Center from any location in the institution.

In FIG. 1A, a user 100 selects an off-the-shelf ASR program 101 at a computer store 107. After buying it 105, the user installs it 110 at home 115. Once started, the ASR program 101 forms a connection, using a modem, through a Public Switched Telephone Network (PSTN) to the Internet. Once on the Internet 140, the program 101 forms a connection with ASR Training Center 150A. Another user 120 has a personal digital assistant (PDA) 121 that has an embedded ASR function. PDA 121 forms a wireless connection with base station 127, whereby PDA 121 connects to the ASR Training Center 150, through PSTN 130 and the Internet 140.

In FIG. 1B, an institution, housed in building 160, has a centralized ASR System Center 150B, located in the bottom of the building. Although housed in one building in FIG. 1B, the institution could be a multinational corporation housed in many buildings located throughout the world, and connected to a private network. At reference number 165, a user is sitting at a desk using a microphone connected to the ASR System Center 150B. At 163, a meeting is being transcribed, using microphones that are connected to the ASR System Center 150B. At 167, two people are talking, and one holds a PDA with a microphone, that has a wireless connection with an overhead antenna. The overhead antenna has a connection with ASR System Center 150B. In another embodiment, residents in building 160 wear small electronic badges on the outside of their clothing. Each of these badges has a microphone, identifying circuitry, and a wireless connection to the closest radio antennae, as well as the closest PDA. These badges allow the ASR System Center 150B to instantly identify user profiles for speaker-dependent ASR processing.

FIGS. 1A and 1B by no means exhaust the possibilities concerning embodiments of the system according to the present invention, and many variations are possible, as will become clear to one skilled in the art.

II. ASR Training Center

Figure 2A:
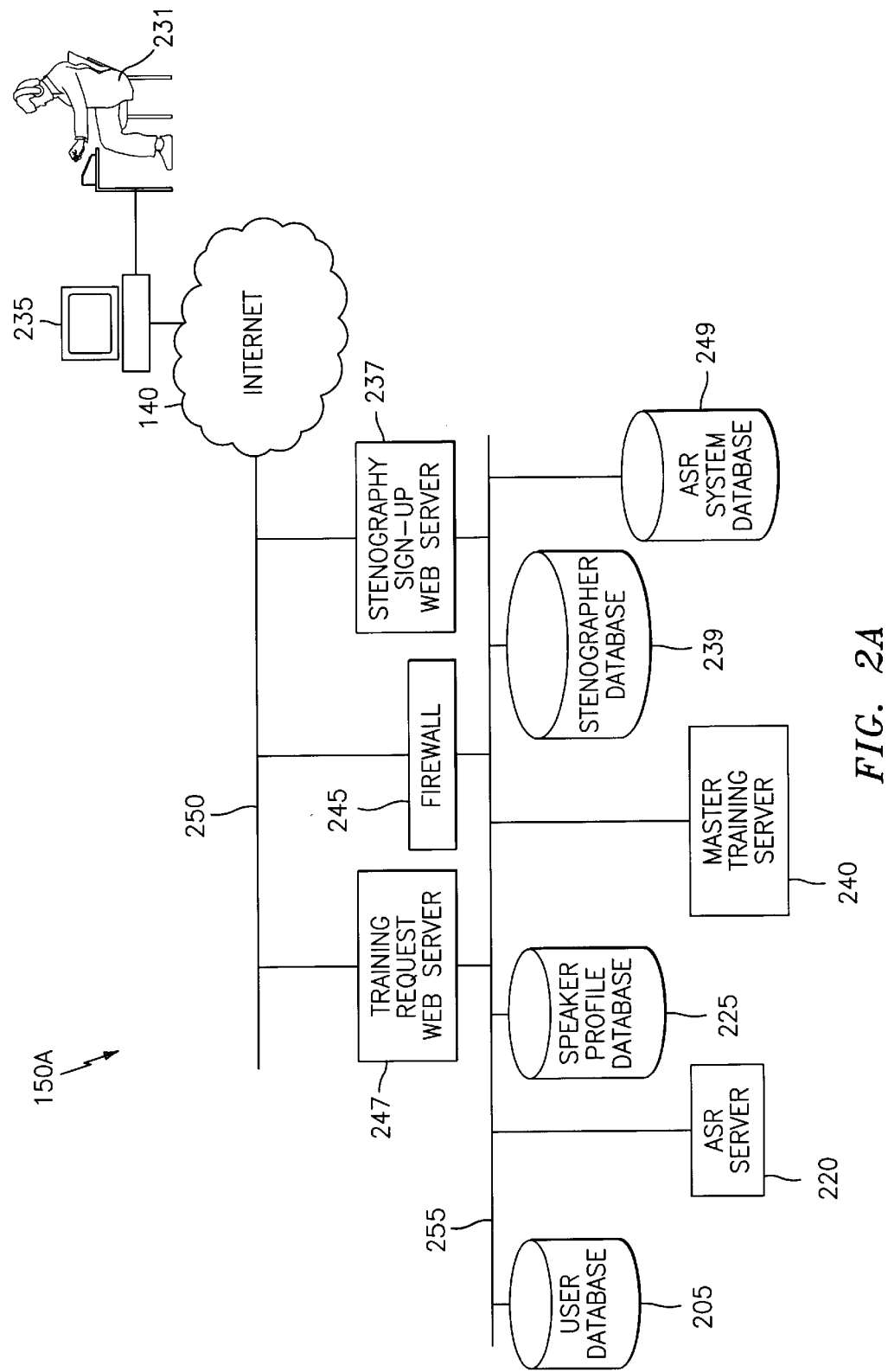
FIG. 2A and 2B are block diagrams of two different embodiments of an ASR Training Center according to the present invention.

In FIG. 2A, the ASR Training Center 150A, which is according to an embodiment such as the one in FIG. 1A, is Internet-based. When a user, such as 100 or 120 in FIG. 1A, begins a session with their ASR system, a connection is made over the Internet 140 from the user's system-to the unsecured LAN 250 at the ASR Training Center 150. Specifically, a connection is made with the Training Request Server 247, which acts as a gateway to the ASR Training Center 150A during training. A Master Training Server 240 handles the request. Information concerning the user, which will be described in greater detail below, is contained in User Database 205. ASR Server 220, on which, in some embodiments, a duplicate ASR system is emulated, and ASR Speaker Profile Database 225, which stores speech profiles of particular individuals, are both connected to secured LAN 255. The ASR Server will be described in greater detail below.

In this embodiment, a pool of stenographers is not maintained at a specific location, but rather individual stenographers, such as stenographer 231, are connected through the Internet 140 to ASR Training Center 150A. Stenographer 231 has his or her stenograph machine connected to PC 235, which is maintaining a connection to the Internet 140. Stenographers sign up for service by means of the Stenography Sign-up Web Server 237. Records concerning stenographers are maintained at Stenographer Database 239. A stenographer record would include billing information, contact and address information, capabilities, history with the training service, etc.

Figure 2B:
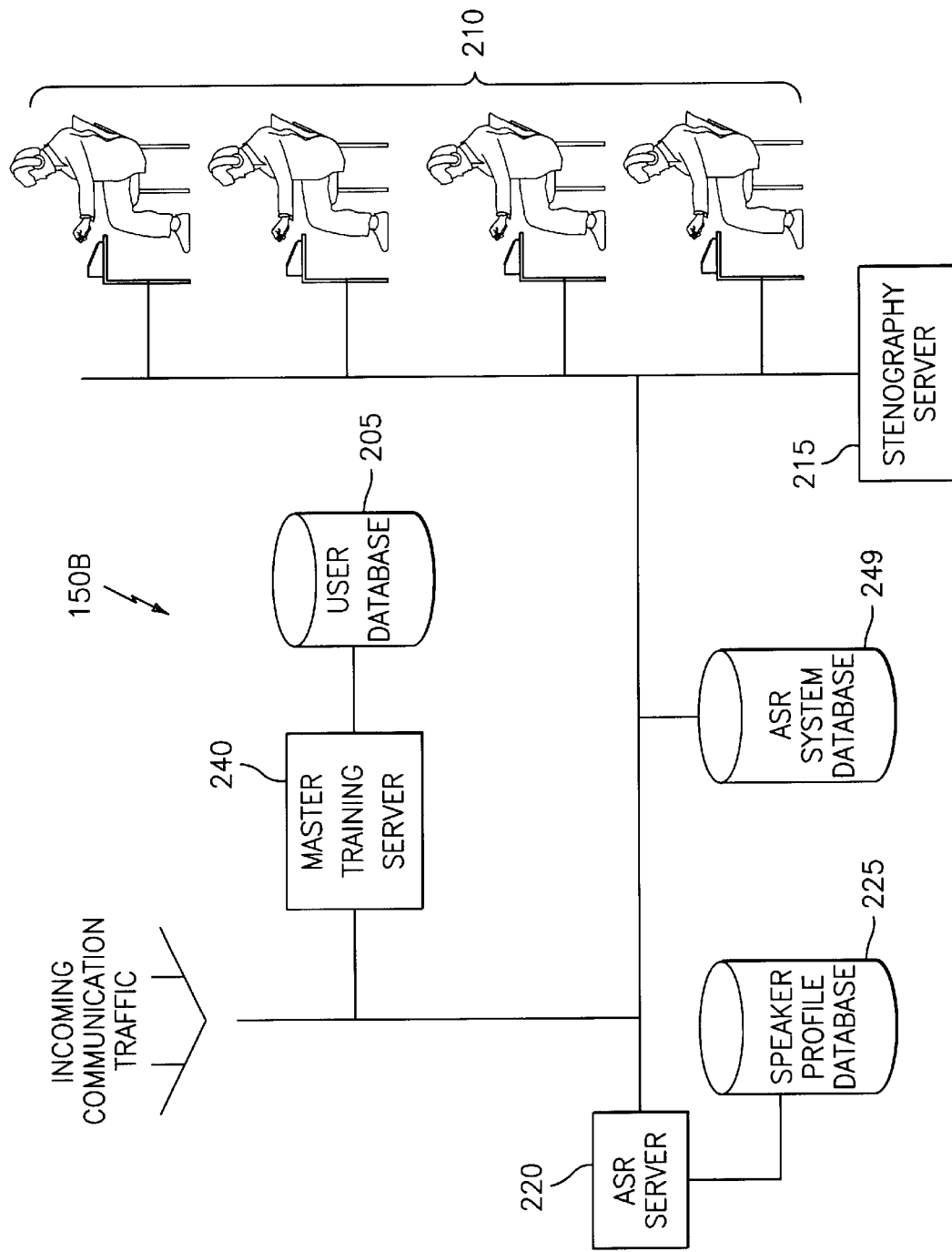

When a training request is received at the ASR Training Center 150, the Master Training Server 240 collects information concerning the user and the user's needed training, by accessing a matching user record in the User Database 205. If the Master Training Server 240 determines that the request is fully authorized, it allows a connection to be made across Firewall 245 to secured network 255. The Master Training Server 240 then directs the user connection to a stenographer 231, who is already connected with the ASR Training Center 150, to begin the training service. In FIG. 2B, the training request the stenographer connection is made on the Internet, but, in other embodiments, the training request or the stenographer connection could be made by direct phone line to the ASR Training Center 150.

Because information is being transferred to the servers over the Internet (or any network), a program layer operable in the user client, stenographer client, and any of the servers on secured network 255 is used to encrypt and decrypt the information. In the embodiments discussed here, SSL (Secure Sockets Layer), which uses a public and private key encryption system, is used to pass sensitive data between user and stenographer terminals and the ASR Training Center 150.

Separation is maintained between secure information, such as customer, stenographer, and billing records, on secured network 255 and the Internet, through unsecured LAN 250, by Firewall 245. For the stenographers, the Stenography Sign-Up Web Server provides limited access in browser format to secured information, but no Internet user will be able to directly access secured information. The term "Web Servers" is to be understood as a World Wide Web-type server that delivers web pages to clients. The web pages are in HTML (Hypertext Mark-up Language), but could be in any mark-up language decipherable by the browsers being used on the network. In this embodiment, data is retrieved from and posted to other servers using CGI (Common Gateway Interface).

The Master Training Server 140 sets up each training session, and its interaction with the other databases and servers will be described in greater detail below. In the embodiments in FIGS. 1-3, the interaction between the user's ASR system and the ASR Training Center is transparent, meaning that the user is completely unaware of the connection and the activity being performed by the ASR Training Center 150. In other embodiments, the user is aware of the activity and may request particular stenographers or manipulate parts of their own user record.

In another embodiment, the ASR Training Center 150 is completely decentralized and distributed over the Internet. This type of distribution would provide locally cached copies of user records, speaker profiles, and stenographer records, as well as determine the stenographer with the least-cost communication route to the user. Because of this distribution, the service would avoid the bottlenecks and slowdowns of communication that are endemic on the Internet. One company that provides a system of distributed servers on the Internet is Akamai™ (www.akamai.com). On the opposite extreme from complete distribution would be an ASR Training Center 150 completely centralized in one server.

In FIG. 2B, an ASR Training Center 150, according to a centralized embodiment of the present invention, as in FIG. 1A, is shown. The Training Center 150 takes the form of a service center with centralized control, where there is a pool of stenographers 210 on call. When an individual training request comes from within building 160, the Master Training Server 201, determines how to service the request, as will be described below. The Master Training Server 201 is connected to User Database 205, which stores information concerning the customers, or users, that use ASR systems in the institution. The Master Training Server 201 hands off the training request to the Stenography Server 215, which organizes the work of the pool of stenographers. In addition, the Master Training Server 150 may hand the training request to ASR Server 220. As with FIG. 2A above, the other databases and servers in FIG. 2B will be described in greater detail below.

As discussed above, according to the present invention, the different servers are not necessarily running on different processors and, on the other hand, each individual server may be split up among multiple processors. In addition, the connections and networks shown in FIGS. 2A and 2B are not the only ones possible, as one skilled in the art would know.

Many different business models could be used with the ASR Training System according to the various embodiments of the present invention. For example, the system in FIG. 2B is appropriate for a centralized institution, where the stenographers are employees, and the system keeps track of ASR training usage by department or division. On the other hand, following the embodiments of FIG. 1A and FIG. 2A, a user 100 could buy an off-the-shelf ASR program, and then negotiate with the ASR Training Center 150 over the price and level of training. Or, as in the preferred embodiment, the use of the ARS Training Center 150 would be transparent to the user, and the cost of the ASR training has already been included in the purchase price of the off-the-shelf program.

III. ASR Training Procedures

There are many ASR Training procedures possible with the various embodiments of the present invention. The procedures run from the fully automated (and transparent), where the user only starts using the ASR program or system, to the largely entry driven, where the user enters all the parameters for the ASR Training service.

Figure 3:
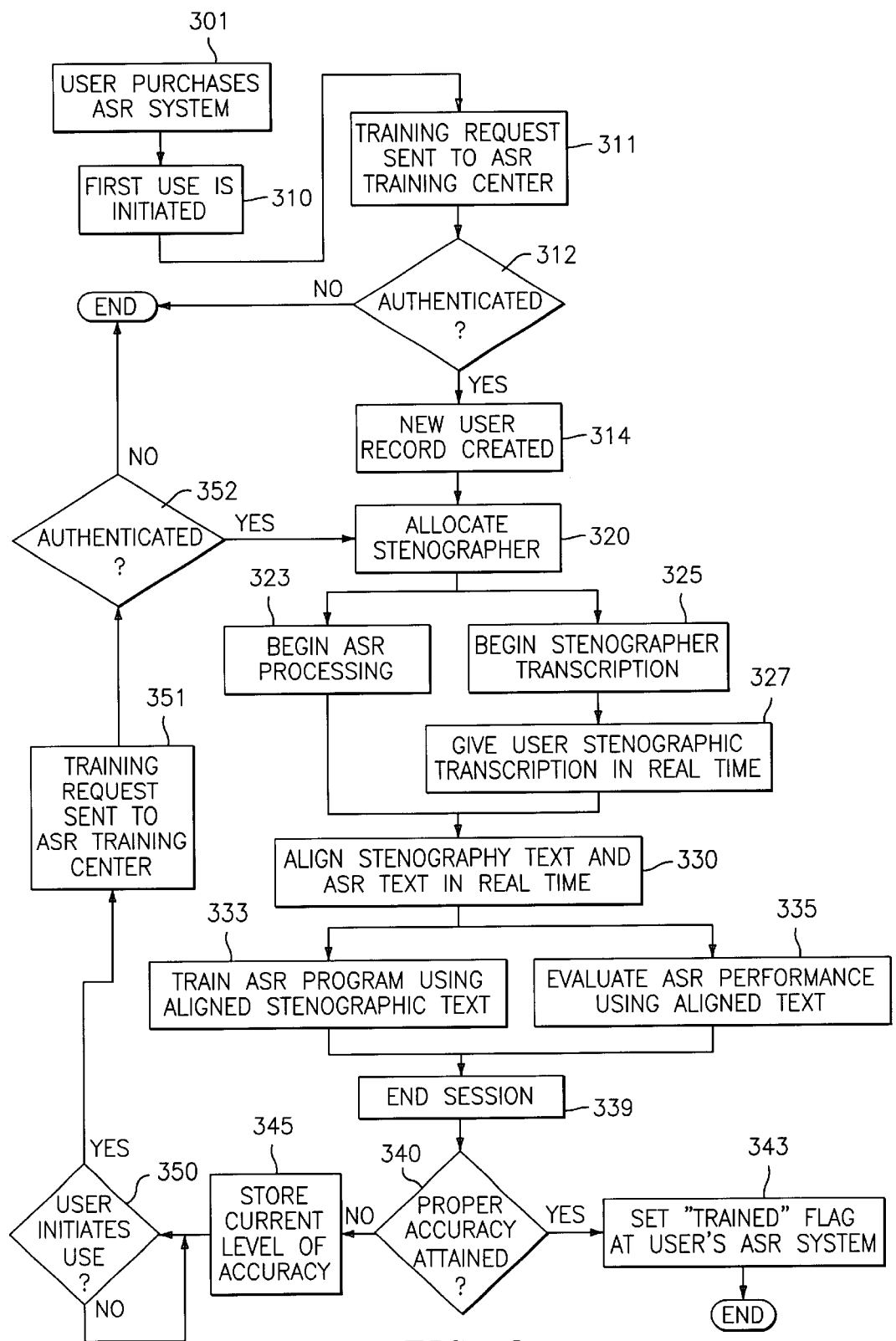
FIG. 3 is a flowchart of a method of ASR training according to one embodiment of the present invention.

FIG. 3 is an example of a fully automated (and transparent) procedure which could be used in the system of FIG. 1A and 2A, according to an embodiment of the present invention. In step 301, a user purchases an off-the-shelf ASR program, in which there is a client for the ASR Training service. The user initiates a first use in step 310, which causes a training request to be sent over Internet 140 to ASR Training Center 150A in step 311. The training request, in the preferred embodiment, contains the serial number of the particular ASR program installed in the user's PC, as well as information identifying the type of ASR system or program, identifying the user, identifying the level of accuracy sought, etc. Since this is the first use, the Master Training Server 240, in step 312, authenticates the information contained in the training request. This could be done in a number of ways, including the transmission of an encrypted digital signature in the training request, or by the Master Training Server 240 checking the serial number against a database of known and authorized serial numbers.

If the training request is not authenticated, the process ends and the connection is closed down. If the training request is authenticated in step 312, the Master Training Server 240 creates, in step 314, a new user record for the user, which will be stored in User Database 205. The information in the training request will be used to fill in some of the fields in the new user record. An exemplary user database record is shown in FIG. 4.

As shown in FIG. 4, the exemplary user record contains a field 401 for the user name; however, this is clearly optional, since the user could just as well be identified by a number. Field 405 identifies the ASR system being used, and Field 406 records the serial number. Field 410 stores the level of accuracy required. The level of accuracy may be determined in a number of ways. In one embodiment, the level of accuracy is displayed on the box containing the off-the-shelf ASR program 101. Thus, the user buys a level of accuracy as well as a license for the ASR program. In another embodiment, the same ASR program could be sold in various different boxes, where each box indicates a different level of accuracy, and the user pays higher amounts for increasing levels of accuracy. In this embodiment, although the ASR program is identical, the training request indicates a different level of accuracy to be maintained. In another embodiment, the user is presented, in a dialog box, with various choices concerning the level of accuracy. When the user chooses one, the user is charged an additional fee directly by the ASR Training Center 150A for that level of accuracy. In yet a further embodiment, the user buys the off-the-shelf ASR program 101, which has no means of creating a training request or of maintaining a connection with the ASR Training Center 150A. In this case, which will be described in greater detail below, the user contracts separately for a certain level of accuracy with the ASR Training Center 150A via a website on the Internet. The type of embodiment where the user's ASR system has nothing "built-in" to connect, communicate, register, etc. with the ASR Training Center 150A will be referred to as a "contracted" embodiment. In contrast, the type of embodiment in which the ASR system does have something built into it, will be referred to as a "built-in" embodiment.

Continuing with FIG. 4, field 415 is the current level of accuracy for the user's ASR system. Field 420 identifies the type of microphone, or the general recording environment, where the user will be engaging the ASR system. Field 430 indicates whether the ASR Training Center 150A has permission to access the ASR program resident on the user's PC. This may be directly related to whether the embodiment is built-in or contracted, as well as to how fast and consistent the communication link between the ASR Training Center 150A and the ASR system is. In some embodiments, referred to as "parallel service" embodiments, the ASR Training Center 150A duplicates everything that is being done in the ASR system. In other embodiments, referred to as "connected service" embodiments, the ASR Training Center 150A "listens" to everything the user's ASR system is doing.

Field 440 in the exemplary user record of FIG. 4 contains pointers or index numbers to speaker profiles used by this particular user. If this embodiment is a parallel service embodiment, the pointers in field 440 point to memory locations where this user's speaker profiles are stored in the Speaker Profile Database 225. This is because, in parallel service, an exact duplicate of the ASR system resident at the user's location runs at the ASR Training Center 150A, and this duplicate creates and modifies speaker profiles, which are duplicates of ones being created and modified at the user's location. In a connected service embodiment, the ASR Training Center 150A would have direct access to the speaker profiles resident locally to the user. Thus, field 440 would have indexes or pointers to the location at the user's ASR system where the user's ASR system stores speaker profiles.

The topic vocabulary field 450 lists the various topics, such as law, medicine, technology, etc., for which the user has built a focused vocabulary. This would have to be indicated by the user in some way. Field 450 would have pointers to where the word models concerning that focused vocabulary are stored. In embodiments that use topic vocabularies, the training request would have information concerning which topic vocabulary to use.

Returning to the procedure in FIG. 3A, after a new user record is created in step 314, the Master Training Server 240 allocates, in step 320, one or more stenographers to transcribe the audio material received from the user. Once the stenographer(s) are set to begin, the user's ASR system signifies to the user that it is OK to begin. This signifier could be a pop-up window or a beep sound. Then, both the ASR system, in step 323, and the stenographer, in step 325, begin transcribing the audio material. When performing parallel service, step 323 indicates that both the user's local ASR system and the ASR Training Center 150A's duplicate of that system have begun processing the audio material. When performing connected service, step 323 indicates that only the user's ASR system would be processing audio material, and the results of that processing would be communicated to the ASR Training Center 150A for analysis. Another way to view the difference between parallel and connected service is that two streams of data (the audio material and the results from the user's ASR system) are being transmitted from the user's ASR system to the ASR Training Center 150A in connected service, but only one stream (the audio material) is being transmitted in parallel service.

Because the user's ASR system is in the training period, the results of the ASR program are not presented to the user, but rather the results of the stenographer's transcription are presented, in step 327, to the user. As stated before, in the preferred embodiments, this is transparent, so that all the user sees are the results being displayed on his or her ASR system. Meanwhile, the resulting text from the ASR processing and the resulting text from the stenographer's transcription are time-aligned in step 330. This is so that a proper comparison can be made between them. Using the aligned stenographic text as a basis, the Master Training Server 240 trains the user's ASR system in step 333. Because different ASR systems may use different procedures for training the word models used in speech recognition, ASR System Database 249 stores information concerning all possible ASR systems and how they work. When performing step 323, Master Training Server 240 uses the information stored in ASR System Database 249 in order to appropriately train the user's ASR system. Furthermore, ASR System Database 249 contains working copies of each ASR system or an emulation thereof, and, when in parallel service, the Master Training Server 249 downloads the duplicate of the user's ASR system from this source. Simultaneously with step 333, the Master Training Server 240 is also evaluating the performance of the user's ASR system in step 335. This evaluation process also uses information from ASR System Database 249 to appropriately tailor the evaluation to the user's particular ASR system.

After the ASR session ends at step 339, the Master Training Server 240 ascertains, in step 340, whether the user's ASR system has attained the requisite level of accuracy, as indicated in field 410 of the exemplary user record of FIG. 4. If the requisite level of accuracy has been reached in step 340, the Master Training Server 240 transmits a command to the user's ASR system to set a "Trained" flag at step 343. In this embodiment, the user's ASR system maintains a flag in memory, which is initialized as clear. When clear, the "Trained" flag indicates to the user's ASR system that a training request needs to be sent to the ASR Training Center 150A every time the user attempts to begin a session. Once set, the training requests cease. The function performed by the "Trained" flag could be performed by any mixture of hardware, software, or human input (such as the user or ASR Training Center 150A's personnel).

If the requisite level of accuracy has not been reached in step 340, the Master Training Server 240 stores the currently attained level of accuracy in the user record and waits, in step 350, for the user to use the ASR system again. When the user initiates the next usage of the user's ASR system in step 350, a training request is transmitted to the ASR Training Center 150A in step 351, and Master Training Server 240 authenticates the request in step 352. If the training request is authentic, the procedure repeats steps 320–340. Steps 320–340 are iterated until the requisite level of accuracy is attained.

Figure 5:
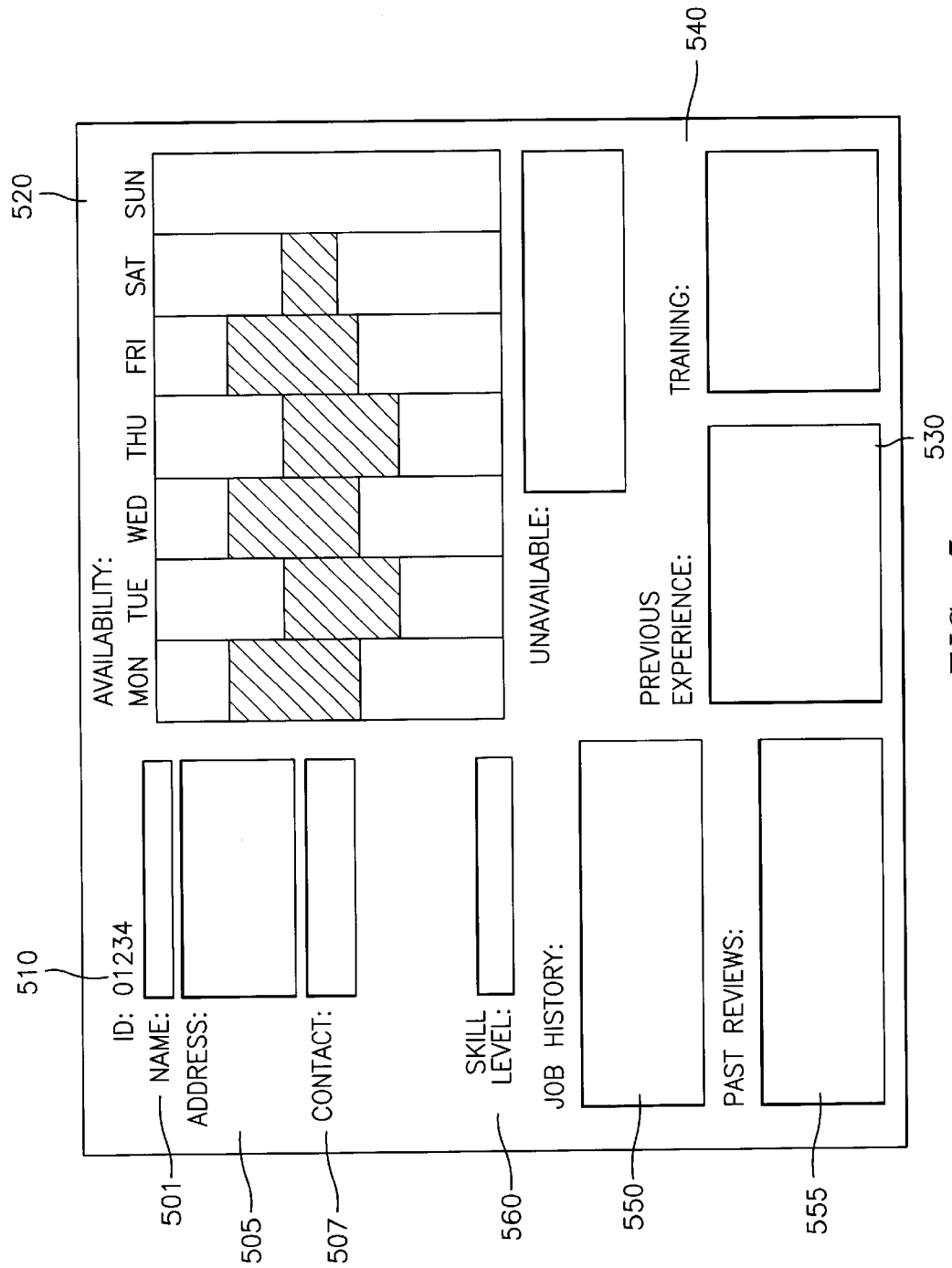
FIG. 5 is an exemplary Stenographer Sign-Up display according to an embodiment of the present invention.

In the distributed framework of FIG. 2A, where stenographers, such as stenographer 231, are connected over the Internet 140 with the ASR Training Center 150A, the allocating one or more stenographers step 320 of FIG. 3 requires a sub-system to track stenographers. In the embodiment of FIG. 2A, this sub-system maintains stenographer records at Stenographer Database 239. To create a stenographer record, a stenographer 231, using PC 235, must first sign up, or subscribe, on the Stenography Sign-Up Web Server 237 in order to indicate their willingness to be a transcription stenographer. When first arriving at the opening web page at the Stenography Sign-Up Web Server 237, stenographer 231 would click on a "Sign up?" button or a "Change Your Stenographer Record?" button. At this point, a Stenographer Sign-Up Web Page, such as the example in FIG. 5, is displayed for stenographer 231 to enter relevant data. Although entitled the Sign-Up Page, this page is also used by previously signed up stenographers to access information concerning their accounts.

In the upper left-hand corner of the Sign-Up Web Page shown in FIG. 5, information such as Name 501, Address 505, and Contact Information 507 is entered. An identification number 510 is automatically generated by the system, and this ID number 510 will be used to identify and track the stenographer. Hours of Availability 520 uses a graphic representation of a week for the stenographer to point and click in order to indicate when he or she is available for work. In some embodiments, each stenographer is informed of what periods of time the sub-system will consider them on call. In other embodiments, each stenographer will be considered on-call during all periods of availability indicated in 520. Time periods of unavailability, such as vacations, are entered in the area beneath the Hours of Availability 520. Previous Experience 530 indicates the amount and type of work previously engaged in by the stenographer. Training 540, of course, bears on the stenographer's previous experience. Job History 550 shows the history of the stenographer with this ASR Training Center 150A, i.e., how many hours logged in, average price per hour, etc. Past Reviews 555 shows past analyses of the stenographer by ASR Training Center 150A personnel. Skill Level 560 may be determined in a number of ways. In one embodiment, personnel at the ASR Training center 150A create a skill level rating based on work experience, training, etc. In another embodiment, the stenographer enters his or her own Skill Level 560. In yet another embodiment, the skill level is constantly reassessed based on feedback, past reviews, and records maintained by the ASR Training Center 150A.

When stenographer 231 is actually on call, the Master Training Server 240 maintains a connection between the ASR Training Center 150A and the stenographer over the Internet 140. Initially, before the on-call period starts, the stenographer logs in to the Master Training Server 150A, and, later, if allocated to perform transcription, the stenographer is connected with the user. The Master Training Server 240 also tracks the elapsed time, and records the transcription, if necessary. In another embodiment, the Master Training Server 240 releases the user-stenographer connection so that it is maintained directly between the parties on the Internet. Yet other embodiments use a direct telephone connection between the ASR Training Center 150A and the two parties.

In the centralized framework of FIG. 2B, stenographer's records would not necessarily be needed. This is because the stenographers are on-site. Furthermore, an ASR Server 220 would not necessarily be needed, because the ASR System Center 150B could be on a dedicated secured network within the institution, and could therefore perform connected service, rather than parallel. Furthermore, in the system and method of the centralized embodiments of FIGS. 1B and 2B, the steps in FIG. 3 would also be altered, deleted, and added to, in a manner consonant with the structures of FIGS. 1B and 2B.

In the contracted embodiments of the present invention, the procedure is more entry-driven; thus, some of the steps in FIG. 3 would be altered, some would be deleted, and some would be added. For instance, in step 310, the user would connect with a web server of the ASR Training Center 150A. In step 314, the user would fill out his or her own user record. In step 350, the user may manually form the connection with the ASR Training Center 150A to initiate a new session.

Figure 6:
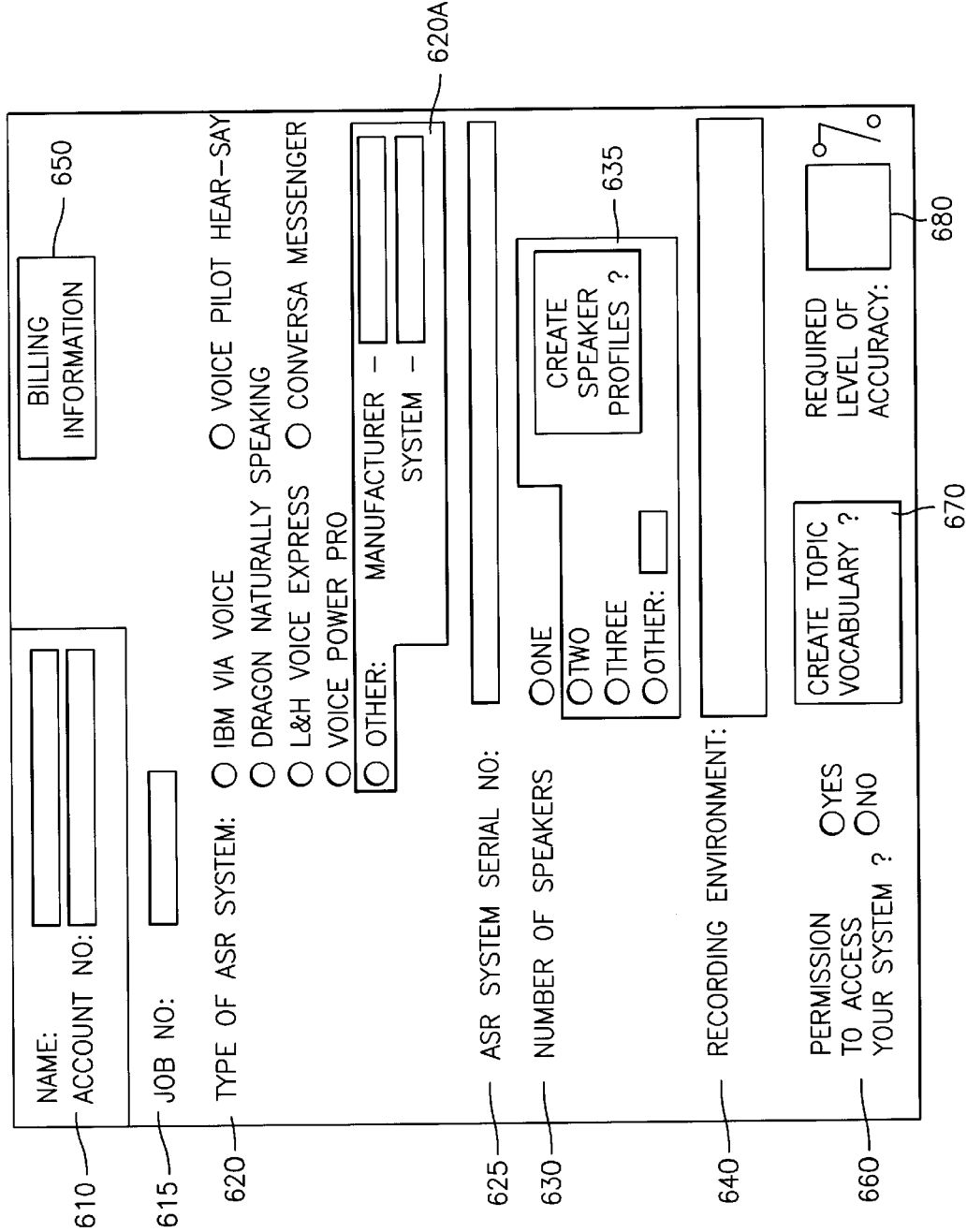
FIG. 6 is an exemplary User Registration Web Page according to an embodiment of the present invention.

FIGS. 6 and 7 are exemplary web pages used in a contracted embodiment of the present invention, and they show the various types of information that would need to be input during the procedure in FIG. 3. In these examples, it is assumed a system like the one in FIG. 2A is used. When a new user initiates the first use of the ASR system in step 310 of FIG. 3, the user would connect with a user interface web server (not shown in FIG. 2A). In this embodiment, the user uses a web browser program, such as Netscape Navigator™, on a PC, such as the one at house 115 in FIG. 1A, to sign up for ASR training, as well as to access and to post information, at the ASR Training Center 150A. When first entering the opening web page at the user interaction web server, the new user would click on a "ASR Training Required?" button. In this context, the terms "click" and "double-click" signify a user pressing the button on a mouse attached to a computer. After clicking the button, a pop-up window, which has fields to enter a login name and password, as well as "New User?" button, appears. When the "New User?" button is pressed, the new user is prompted to enter registration information, including billing and contact information. This registration information is used both to authenticate the new user in step 312 and to create a new user record in the User Database 205. In addition, a login name and password is selected for the new user. As mentioned above, the communications between the browser client and the web server are encrypted using SSL.

FIG. 6 shows an exemplary User Registration Web Page, which is used by the user to enter his or her information. The user name and account number 610, and an automatically generated job number 615, are displayed in the upper left-hand corner. The job number 615 is used in case one user has multiple ASR systems being trained. The user enters the type of ASR system in the appropriate fields 620. The customer can either click on one of the more popular types, or enter a particular ASR system in 620A. At 625, the serial number of the user's ASR system is entered. The number of speakers is entered at 630, and, if more than one speaker is indicated, the user can indicate that speaker profiles are being created by clicking button 635. When button 635 is clicked on, another dialog box appears, in which the user enters information concerning, and perhaps names of, the speaker profiles. The microphone, or recording, environment is described at 640. At 660, the user indicates whether the ASR Training center has permission to access the user's ASR system. When button 670 is clicked, a dialog box appears for creating one or more topic vocabularies. The level of accuracy to which the user desires to train his or her ASR system is entered in the large box 680 in the lower right-hand corner. If button 650 is clicked, a dialog box displaying the user's billing information is displayed. FIG. 6 should be understood as just one embodiment of a User Registration Web Page, and much more, or much less, user information could be entered. For instance, the current level of accuracy attained by the ASR program could be shown.

In this embodiment, after the user has registered, the user may return, at any time, to begin a training session. In other embodiments, the ASR Training Center 150A installs a communication link program at the user's ASR system. This communication link program automatically connects with the ASR Training Center 150A whenever the user initiates a new ASR session. Continuing with this embodiment, when the user desires to start a training session, he or she returns to the opening web page, where he or she clicks on a "Start Training Session?" button. At this point, a pop-up window appears, where the user enters his or her login name and password. Then, Master Training Server 240 performs steps 320 to 340 of FIG. 3.

In another embodiment, the Master Training Server 240 at the ASR Training Center 150A generates different bids for training the user's ASR system with different parameters. An exemplary Automated Bidding Web Page is shown at FIG. 7. Information 710 concerning the job, such as type of ASR system, serial number, required level of accuracy, etc., is shown at the top of the page. The highest and lowest generated bids are shown at 715. Beneath that, generated bids 720 are separately indicated by the amount and kind of resources that would be used by the ASR Training Center 150A. In other words, the user is viewing bids on varying levels of accuracy, the times when training will be available, and other parameters. In the example of FIG. 7, Bid#1, indicated by 721, provides a 92% level of accuracy for $50. To attain this level of accuracy, the Master Training Server 240 estimates it will take 30 hours of training. For Bid 1, the user has "ALL" times of training available, so that he or she may use the ASR system and train it, at any time of day or night, weekday or weekend. If the user is willing to limit himself or herself to training only in the daytime, the price goes down to $45, as shown in Bid#2. The additional options of receiving an e-mail transcript of the session, which would cost $55, or of being mailed a printed transcript, which would cost $60, are shown in Bid#1. Other embodiments could provide parameters involving any facet of the communication links, computing resources, or stenography resources to be bid on. For example, in other embodiments, the bids could vary over the number of topic vocabularies, the number of speakers, whether access is permitted, or the recording environment.

It should be noted that different embodiments of the present invention would cover the full range between and beyond the extremes of FIGS. 1A/2A and FIGS. 1B/2B.

Besides the advantages made clear in the exposition above, one advantage of a system and method in accordance with the present invention is that the user of a new ASR system is not subjected to the inconvenience of training the new ASR system, nor is the user subjected to the errors produced either during training or due to insufficient training. Another advantage is that a user may select a desired level of accuracy based on the amount of money the user wishes to expend on that desired level of accuracy. Yet another advantage is that the cost and resources used for the level of accuracy can be separated from the cost and resources used for the new ASR system itself. In addition, any ASR system, comprised of any combination of hardware and software, can be trained using a system and method in accordance with the present invention.

While the present invention has been described with respect to certain preferred embodiments, it should be understood that the invention is not limited to these particular embodiments, but, on the contrary, the invention is intended to cover all modifications, equivalents, and alternatives falling within the spirit and scope of the invention as defined by the appended claims.

What is claimed is:

1. A method of training one or more local Automatic Speech Recognition (ASR) systems, said method being performed on a computing device having at least one connection to a network, the method comprising the steps of:
   receiving a request for training of said local ASR system;
   identifying a user of said local ASR system and determining said user's profile;
   allocating at least one of a plurality of stenographers of a remote ASR system having at least one connection to the network, said plurality of stenographers using computing devices having at least one connection to the network;
   transcribing identified user's speech into a second transcribed text by said allocated stenographers, said identified user's speech being simultaneously transcribed by the local ASR system into a first transcribed text;
   providing the second transcribed text in time alignment with the first transcribed text to the identified user of the local ASR system; and
   training, using the aligned second transcribed text, the local ASR system, wherein said providing and training steps are performed simultaneously.

2. The method of claim 1, further comprising the step of:
   evaluating an acquired level of performance proficiency of the local ASR system.

3. The method of claim 2, further comprising the step of:
   recording, after completing a said training, the acquired level of performance proficiency of the local ASR system.

4. The method of claim 2, further comprising the step of:
   comparing the acquired level of performance proficiency with a predetermined level of proficiency, to determine that the local ASR system no longer requires training.

5. The method of claim 1, further comprising the step of:
   authenticating a request for training received from the one or more local ASR systems, said authentication being made to determine whether the local ASR system requesting training is authorized to receive training.

6. The method of claim 5, wherein the request for training is selected from a group of at least one training parameter, an identification of the local ASR system, the identification of the user, and an identification of at least one speaker profile.

7. The method of claim 6, wherein the at least one training parameter is selected from a group of a desired level of accuracy and a stenographer allocation parameter.

8. The method of claim 1, wherein the steps of providing the second transcribed text and training are performed in real time.

9. The method of claim 1, wherein the network is the Internet.

10. The method of claim 1, wherein the steps of transcribing, providing the second transcribed text, and training are performed for each identified user of said local ASR system.

11. The method of claim 1, further comprising a step of identifying the local ASR system trough receipt of information about the local ASR system included in said request for training.

12. The method of claim 11, wherein the information about the local ASR system includes a type and a serial number of the local ASR system, wherein the information about the local ASR system allows the remote ASR system to start non-intrusive training of the local ASR system without active participation of the user of the local ASR system.

13. The method of claim 1, wherein said user's profile includes a type and a serial number of the ASR system, a required level of accuracy selected from a plurality of levels, a present level of accuracy, and a recording environment selected from one of a microphone, an identification badge having a built-in microphone, a telephone, a personal digital assistant (PDA).

14. The method of claim 1, wherein allocating comprises the steps of:
   signing up a stenographer of said plurality of stenographers to indicate said stenographer's availability to perform transcription; and
   making stenographer's data available to the remote ASR system;
   assigning an automatically generated identification (ID) number to identify and track the stenographer.

15. The method of claim 14, wherein said stenographer's data includes stenographer's name, address, contact information, time that the stenographer is available, previous work experience indicating amount and type of work previously engaged in by the stenographer, job history indicating how many hours the stenographer has been logged in the remote ASR system and average price per hour, past reviews indicating past analyses of the stenographer by the remote ASR system, stenographer's skill level.

16. The method of claim 15, wherein said time that the stenographer is available is graphically represented to indicate a week, a day, and hours.

17. The method of claim 15, wherein said time that the stenographer is available is represented by periods of time.

18. The method of claim 15, wherein said time that the stenographer is unavailable is represented by periods of time.

19. The method of claim 15, wherein said stenographer's skill level is determined according to a skill level rating based on said previous work experience and training.

20. The method of claim 15, wherein said stenographer's skill level is determined according to the stenographer's own skill level assessment.

21. The method of claim 15, wherein said stenographer's skill level is constantly reassessed based on feedback from the one or more local ASR systems, past reviews, and records maintained by the remote ASR system.

22. The method of claim 15, further comprising a step of using said stenographer's data to identify the stenographer closest to the local ASR system to minimize the network communication rout cost.

23. The method of claim 1, further comprising the steps of
maintaining a network connection between the remote ASR system and the stenographer when the stenographer has signed-up;
monitoring a network connection between the local ASR system and the stenographer when the stenographer has been allocated;
tracking the elapsed time, and recording the stenographer's transcription.

24. The method of claim 23, wherein the network is the telephone grid.

25. The method of claim 23, wherein the network is the hardwired connection between the local ASR system, the remote ASR system, and the stenographer.

26. The method of claim 1, further comprising the step of terminating said training when a predetermined level of proficiency is achieved.

27. The method of claim 1, wherein the identifying of said user is achieved using information received from an identification badge having a built-in microphone.

28. A computer program device readable by a machine, tangibly embodying a program of instructions executable by the machine to perform method steps for a method of training one or more local Automatic Speech Recognition (ASR) systems, said method being performed on a computing device having at least one connection to a network, the method comprising the steps of:
receiving a request for a training of said local ASR system;
identifying a user of said local ASR system and determining said user's profile;
allocating at least one of a plurality of stenographers of a remote ASR system having at least one connection to the network, said plurality of stenographers using computing devices having at least one connection to the network;
transcribing identified user's speech into a second transcribed text by said allocated stenographers, said identified user's speech being simultaneously transcribed by the local ASR system into a first transcribed text;
providing the second transcribed text in time aligned with the first transcribed text to the identified user of the local ASR system; and training, using the aligned second transcribed text, the local ASR system, wherein said providing and training steps are performed simultaneously.

29. A system for training an Automatic Speech Recognition (ASR) system comprising:
a first ASR system to be trained, local to at least one user;
a second ASR system, remote to the at least one user;
means for receiving a request for training of said first ASR system from at least one of a plurality of identifiable users;
means for identifying a user of said local ASR system and determining said user's profile;
means for transcribing identified user's speech into a second text by at least one stenographer, said identified user's speech being simultaneously transcribed by the first ASR system into a first transcribed text;
means for aligning in time the second transcribed text with the first transcribed text;
means for providing the second transcribed text in time alignment with the first transcribed text to the at least one user of the first ASR system; and
means for training, using the aligned second transcribed text, the first ASR system, wherein said means for providing and training perform simultaneously.

30. The system of claim 29, further comprising:
means for evaluating an acquired level of performance proficiency of the ASR system.

31. The system of claim 29, further comprising:
means for recording the acquired level of performance proficiency of the ASR system.

32. The system of claim 31, wherein the means for recording further comprises:
means for determining when an evaluation of the ASR system indicates a predetermined level of performance proficiency that the ASR system no longer needs training.

33. The system of claim 29, further comprising:
means for authenticating a received request for training.

* * * * *